United States Patent
Kawazoe

[19]

[11] Patent Number: 5,956,208
[45] Date of Patent: *Sep. 21, 1999

[54] MAGNETIC HEAD DEVICE HAVING BENT TERMINAL LEAD WIRES FOR ESTABLISHING AN ELECTRICAL CONNECTION WITH A MAGNETIC HEAD ON A SLIDER

[75] Inventor: Kazushige Kawazoe, Miyagi, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/683,857

[22] Filed: Jul. 19, 1996

[30] Foreign Application Priority Data

Jul. 21, 1995 [JP] Japan .................................. 7-185718

[51] Int. Cl.$^6$ ........................................................ G11B 5/60
[52] U.S. Cl. ............................................................. 360/104
[58] Field of Search ................................. 360/104, 105, 360/106

[56] References Cited

U.S. PATENT DOCUMENTS 4,761,699   8/1988   Ainslie et al. ........................... 360/104
5,384,432   1/1995   Noro et al. .............................. 360/104
5,491,597   2/1996   Bennin et al. .......................... 360/104
5,557,489   9/1996   Nakashima et al. .................... 360/104

FOREIGN PATENT DOCUMENTS

A-0 576 904   1/1994   European Pat. Off. .
A-0 593 697   4/1994   European Pat. Off. .
A-0 595 513   5/1994   European Pat. Off. .

*Primary Examiner*—David D. Davis
*Attorney, Agent, or Firm*—Hill & Simpson

[57] ABSTRACT

A magnetic head device in which a terminal of a thin-film lead wire formed on a gimbal and a terminal of a magnetic head device of a magnetic head loaded on a slider mounted on the gimbal may be connected to each other easily and reliably. That is, the slider carrying the magnetic head is mounted on the gimbal carrying a patterned thin-film lead wire, and the terminal of the thin-film lead wire is connected to the terminal of the magnetic head device. The portion of the gimbal formed with the terminal of the thin-film lead wire is bent and the terminal of the thin-film lead wire formed on the bent gimbal portion is contacted with the terminal of the recording head for establishing electrical connection between the terminal of the thin-film lead wire and the terminal of the magnetic head.

6 Claims, 13 Drawing Sheets

MAGNETIC HEAD DEVICE HAVING BENT TERMINAL LEAD WIRES FOR ESTABLISHING AN ELECTRICAL CONNECTION WITH A MAGNETIC HEAD ON A SLIDER

BACKGROUND OF THE INVENTION

1. Field of the Invention

This invention relates to a magnetic head device in which a slider having a magnetic head loaded thereon is mounted on a gimbal having a thin-film lead wire patterned thereon and the thin-film lead wire has its terminals connected to terminals of the magnetic head, and which may be suitably used for a hard disc device.

2. Description of the Related Art

A magnetic head device used for a magnetic recording device, such as a hard disc device, includes a base plate 101, a load beam 102 mounted on the base plate 101, a gimbal 103 mounted on the distal end of the load beam 102, and a slider 104 having loaded thereon a magnetic head 106 mounted on the gimbal 103, as shown in FIG. 1.

The load beam 102, functioning as a suspension for thrusting the slider 104 against a recording medium during recording/reproduction, includes an arm mounting portion 102a, to which the base plate 101 is mounted, an elastic portion 102b, bent at a pre-set angle for operating as an elastic portion, a tough portion 102c bent on both sides for being rendered tough, and a gimbal mounting portion 102d mounting the gimbal. When the magnetic head device is assembled on the magnetic recording device, the arm mounting portion 102a, to which is mounted the base plate 101, is mounted on an arm designed for moving the magnetic head device.

The gimbal 103, mounted on the distal end of the load beam 102, that is the gimbal mounting portion 102d, is configured for not obstructing movement of the slider 104. The gimbal 103 is formed with an opening 103a around a mounting portion for the slider 104 for permitting the slider 104 to be moved in both the pitching and rolling directions. By the gimbal 103 having such opening 103a, the slider 104 may be moved in both the pitching and rolling directions, such that the slider 104 may be maintained at a constant floating height on the recording medium during recording/reproduction irrespective of, for example, surface states of the recording medium.

The slider 104, mounted on the gimbal 103, is formed with the magnetic head 106 comprised of a magnetic core and a coil. For recording/reproduction, the magnetic head 106 is floated on the recording medium along with the slider 104, and records and/or reproduces data on or from the recording medium in the thus floated state.

A lead wire 105 is lead out at a terminal 104a of the magnetic head 106. The lead wire 105 is lead along the gimbal 103 and the load beam 102 to the arm so as to be connected to an external circuit.

With such magnetic head device, as the magnetic recording medium is reduced in size or increased in capacity, the size of the slider 104 tends to be reduced, while the float amount of the slider 104 during recording/reproduction also tends to be diminished. Specifically, the slider 104 is not more than 2.0 mm or less in length, not more than 1.6 mm or less in width and not more than 0.43 mm in height, with the amount of float during recording/reproduction being not more than 0.1 μm.

However, as the slider 104 is reduced in size and the amount of float is decreased, the effect of the toughness of the lead wire 105 connected to the terminals 104a of the magnetic head 106 becomes significant with respect to the movement of the slider 104. That is, movement of the slider 104 becomes unstable under the effect of toughness of the lead wire 105, such that the amount of float of the slider 104, for example, is changed, thus disabling regular recording/reproduction.

For resolving this problem, a method has been developed which consists in forming a thin-film lead wire on the gimbal 103. With this method, the lead wire 105 is not connected to the terminal 104a of the magnetic head 106, but a thin-film lead wire is previously formed on the gimbal 103 and the terminal of the thin-film lead wire is connected to the terminal 104a of the magnetic head 106. This significantly diminishes the effect of the lead wire on the movement of the slider 104.

An instance of connecting the terminal of the thin-film lead wire to the terminal of the magnetic head is described in, for example, JP Patent Kokai Publication JP-A-6-215513. In the instance described in JP Patent Kokai Publication JP-A-6-215513, a thin-film lead wire 111 is previously formed on the gimbal 110, as shown in FIG. 2. Au balls 115 are arranged between a terminal 112 of the thin-film lead wire 111 and a terminal 114 of a magnetic head 113, using an Au ball bonder device, and the thin-film lead wire 111 has its terminals 112 connected to terminals 114 of the magnetic head 113.

However, if the terminals 112 of the thin-film lead wire 111 are connected in this manner to the terminals 114 of the magnetic head 113 using the Au balls 115, the Au balls 115, the terminals 112 of the thin-film lead wire 111 and the terminals 114 of the magnetic head 113 need to be in register with one another with high precision with the progress in the size reduction of the magnetic head 113, such that it becomes difficult to connect the terminals 112 of the thin-film lead wire 111 to the terminals 114 of the magnetic head 113 reliably. In addition, with the progress in size reduction of the magnetic head 113, the terminals 112 of the thin-film lead wire 111 and the terminals 114 of the magnetic head 113 are also reduced in size and hence the Au balls 115 also have to be reduced in size, such that it becomes difficult to connect the terminals 112 of the thin-film lead wire 111 to the terminals 114 of the magnetic head 113 reliably.

Thus, with the use of the thin-film lead wire 111, it is difficult to connect the terminals 112 of the thin-film lead wire 111 to the terminals 114 of the magnetic head 113 reliably, such that it is becoming crucial to enable reliable connection of the terminals 112 of the thin-film lead wire 111 to the terminals 114 of the magnetic head 113 in an easy manner.

If the thin-film lead wire is used, the effect of toughness of the lead wire for the slider movement can be reduced significantly, as explained above. However, if the slider is reduced further in size, it becomes difficult to override the effect of the toughness of the thin-film lead wire. That is, with the conventional thin-film lead wire, a Cu pattern 122 is formed on an insulating layer 121 formed on the gimbal 120, and a protective layer 123 of, for example, polyimide, is formed on the Cu pattern 122, as shown in FIG. 3. Thus the conventional thin-film lead wire is increased in toughness. Consequently, with the progress in reduction in size of the slider, it becomes difficult to override the effect of the toughness of the thin-film lead wire on the slider movement, such that some means need to be provided for decreasing the toughness of the thin-film lead wire.

SUMMARY OF THE INVENTION

It is therefore an object of the present invention to provide a magnetic head device whereby the terminals of the thin-film lead wire can be easily reliably connected to the terminals of the magnetic head.

It is another object of the present invention to provide a magnetic head device whereby the thin-film lead wire of the magnetic head device can be decreased in toughness.

According to the present invention, there is provided a magnetic head device in which a slider carrying a magnetic head is mounted on a gimbal having a thin-film lead wire patterned thereon and in which the thin-film lead wire has its terminal connected to a terminal of the magnetic head, wherein the portion of the gimbal carrying the terminal of the thin-film lead wire is bent, the terminal of the thin-film lead wire formed on this bent portion being contacted with the terminal of the magnetic head for establishing electrical connection between the terminal of the thin-film lead wire and the terminal of the magnetic head.

With the magnetic head device, the terminals of the thin-film lead wire and the magnetic head are directly interconnected without using Au balls or the like. Thus, with the present magnetic head device, if the terminals of the thin-film lead wire are previously formed on the gimbal in association with the terminals of the magnetic head, the terminals of the thin-film lead wire and the terminals of the magnetic head may be accurately connected with each other by simply arraying the slider carrying the magnetic head in position on the gimbal and bending the portion of the thin-film lead wire carrying the terminals without raising the problem of mistaken registration of the Au balls.

The thin-film lead wire of the magnetic head device is preferably covered with the electrically conductive protective film. If the protective film of the thin-film lead wire is formed of an electrically conductive material, the thin-film lead wire can be lowered in toughness since the electrically conductive thin film can be reduced in thickness as compared to the polyimide thin film conventionally used as a protective layer.

Thus, with the thin-film magnetic head of the present invention, the terminals of the thin-film lead wire and the magnetic head can be interconnected easily and reliably. Since the protective film of the thin-film lead wire is formed of an electrically conductive material, it becomes possible to reduce ill effects of the thin-film lead wire on slider movement in the pitching and rolling directions during recording/reproduction.

DESCRIPTION OF THE PREFERRED EMBODIMENTS

Figure 1:
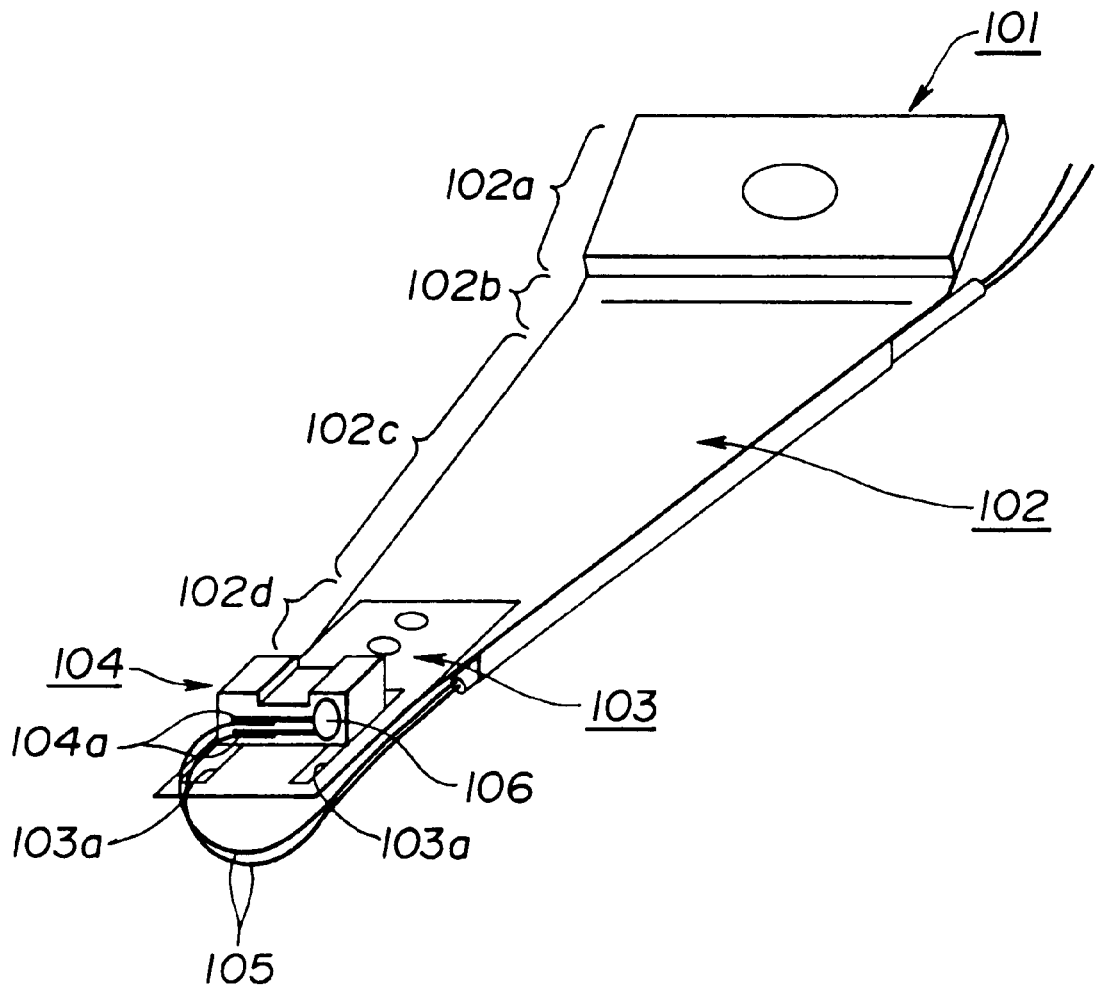
FIG. 1 is a perspective view showing an embodiment of a conventional magnetic recording device.
Figure 2:
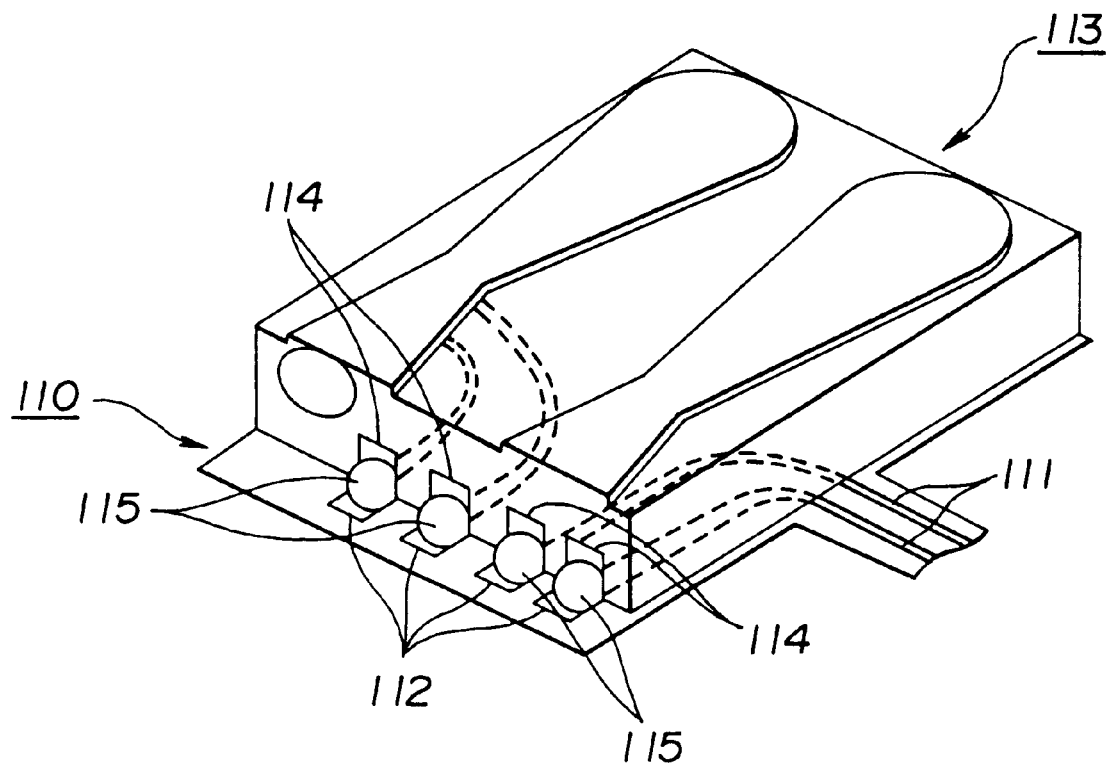
FIG. 2 is a perspective view showing the manner of connection between the terminals of the thin-film lead wire and terminals of the magnetic head in the conventional magnetic head device.
Figure 3:
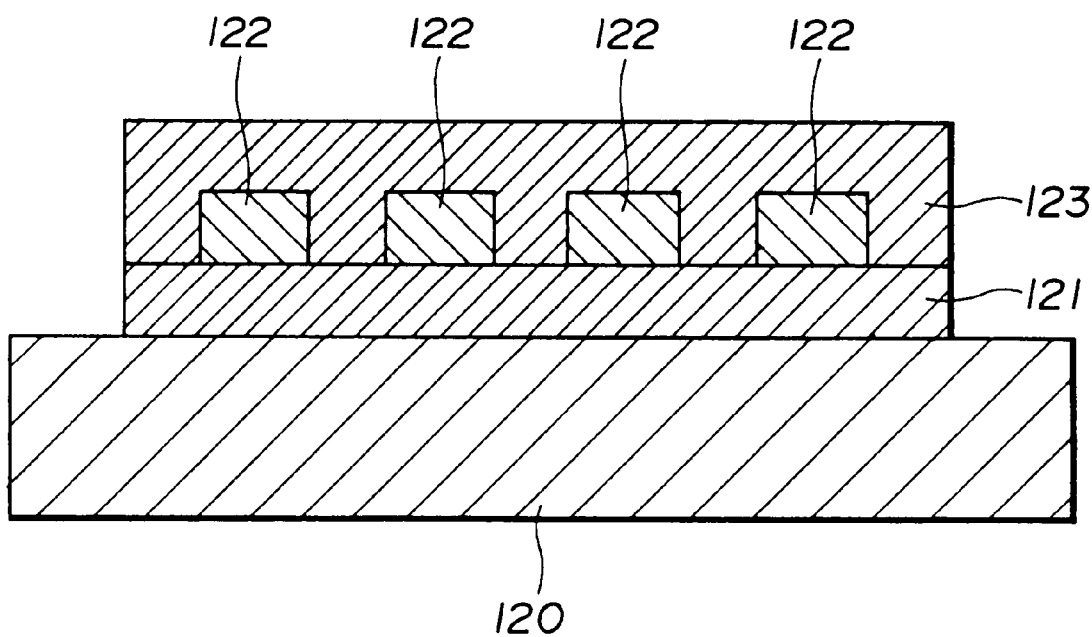
FIG. 3 is a cross-sectional view showing the structure of a thin-film lead wire in the conventional magnetic head device.

Referring to the drawings, illustrative embodiments of the present invention will be explained in detail. The present invention, however, is not limited to these specific embodiments and may be modified as to the shape or material type within the scope of the invention.

Figure 4:
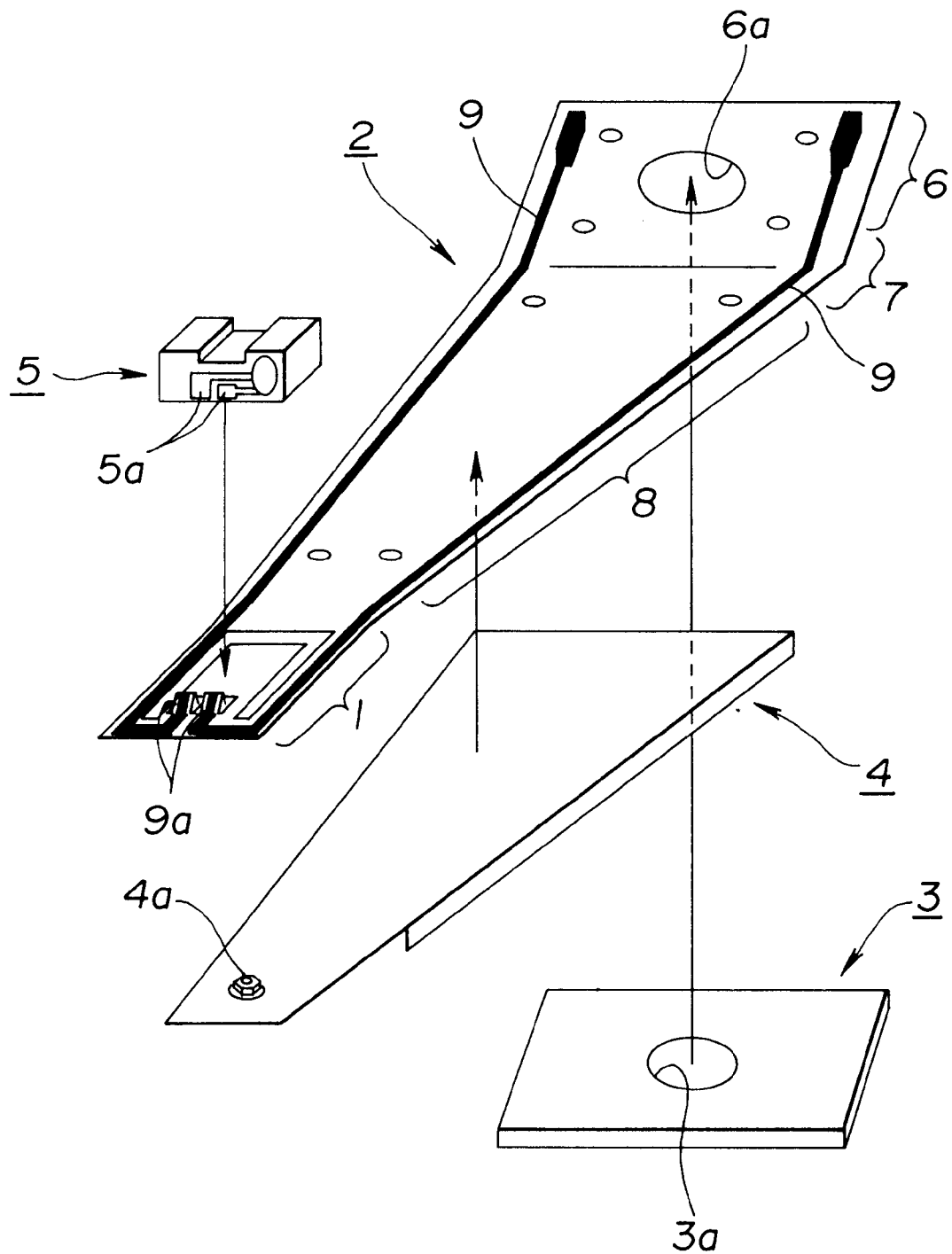
FIG. 4 is an exploded perspective view showing an embodiment of a magnetic head device according to the present invention.
Figure 5:
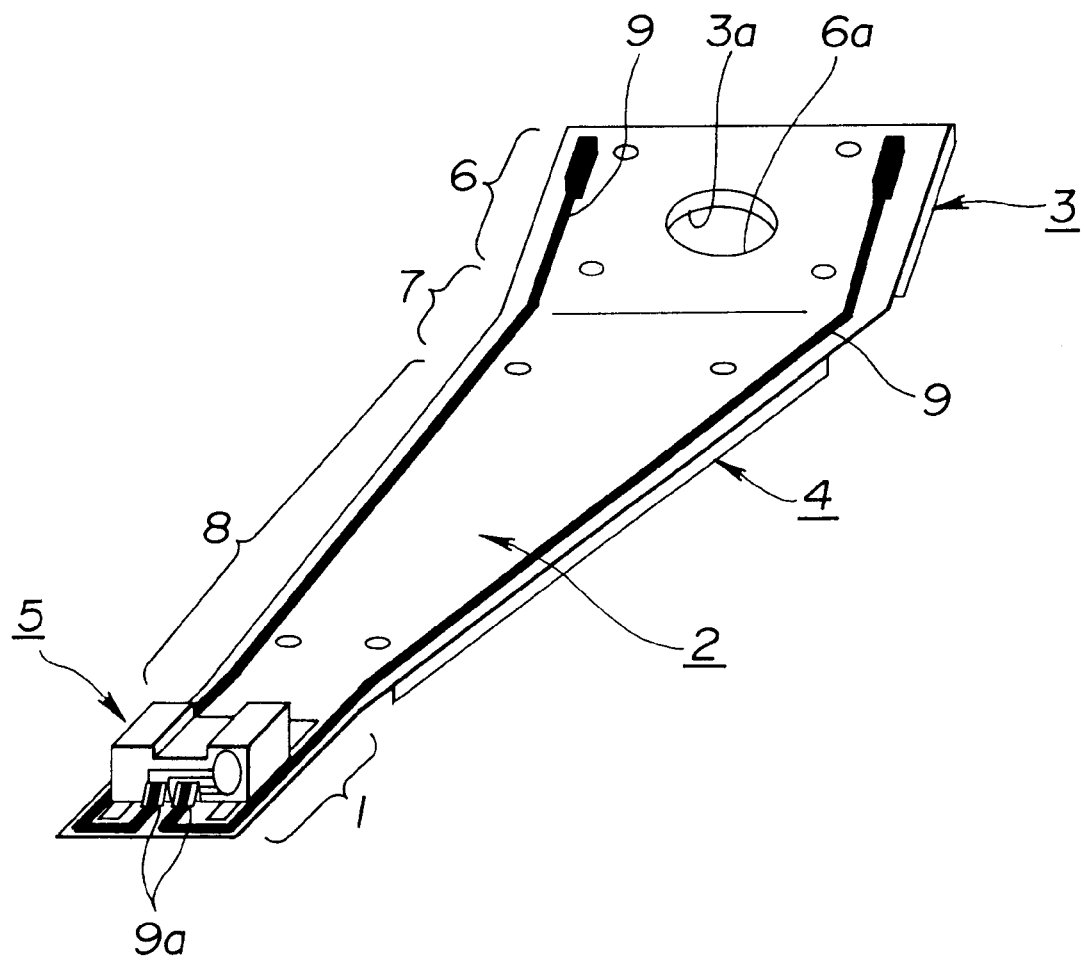
FIG. 5 is a perspective view showing an embodiment of a magnetic head device according to the present invention.

The magnetic head device according to the present invention includes a load beam 2, having a gamble portion 1, operating as a gimbal, formed at the distal part thereof, a base plate 3 mounted at the rear end of the load beam 2, a reinforcement plate 4 mounted on the back surface of the load beam 2 for reinforcing the load beam 2 and a slider 5 having loaded thereon a magnetic head mounted on the gimbal portion 1 of the load beam 2, as shown in FIG. 4. These components are assembled together as shown in FIG. 5.

The load beam 2 has, looking from its rear end towards its forward end, an arm mounting portion 6, to which the base plate 3 is mounted, an elastic portion 7, bent at a pre-set angle, a tough portion 8, to the back side of which is mounted a reinforcement plate, a gimbal portion 1, operating as a gimbal, and a pair of thin-film lead wires 9 formed from the gimbal portion 1 up to the arm mounting portion 6. Each thin-film lead wire 9 is comprised of a Cu pattern of a pre-set shape formed on an insulating layer formed on the load beam 2 and an electrically conductive protective film covering the Cu pattern.

The base plate 3 is mounted on the arm mounting portion 6 so that the position of an opening 6a formed at the center of the arm mounting portion 6 coincides with that of an opening 3a formed at the center of the base plate 3. The openings 3a, 6a are used for mounting the magnetic head device on the arm of the magnetic recording device when assembling the magnetic head device on the magnetic recording device.

The elastic portion 7, extended from the arm mounting portion 6, to which is mounted the base plate 3, and bent at a pre-set angle, operates as a suspension for thrusting the slider 5 against the recording medium during recording/reproduction. On the other hand, the tough portion 8 positioned between the elastic portion 7 and the gimbal portion 1, has the reinforcement 4 attached to its back surface and supports the slider 5 mounted on the distal end of the load beam 2. The reinforcement plate 8 has, on its distal end, a protrusion 4a, and is mounted on the load beam 2 for thrusting the slider 5 from the back surface of the gimbal portion 1.

The gimbal portion 1, formed on the distal end of the load beam 2, operates as a gimbal for obstructing movement of the slider 5 in the pitching and rolling directions. The magnetic head, comprised of the magnetic core and the coil, is formed on the slider 5 mounted on the gimbal portion 1, and a terminal 5a for recording/reproduction is exposed on the lateral surface of the slider 5. To this terminal 5a of the recording head is connected a terminal 9a of the thin-film lead wire 9 formed on the load beam 2.

The interconnection of the terminals 5a of the magnetic head 5 and the terminals 9a of the thin-film lead wires 9 is explained in further detail.

Figure 6:
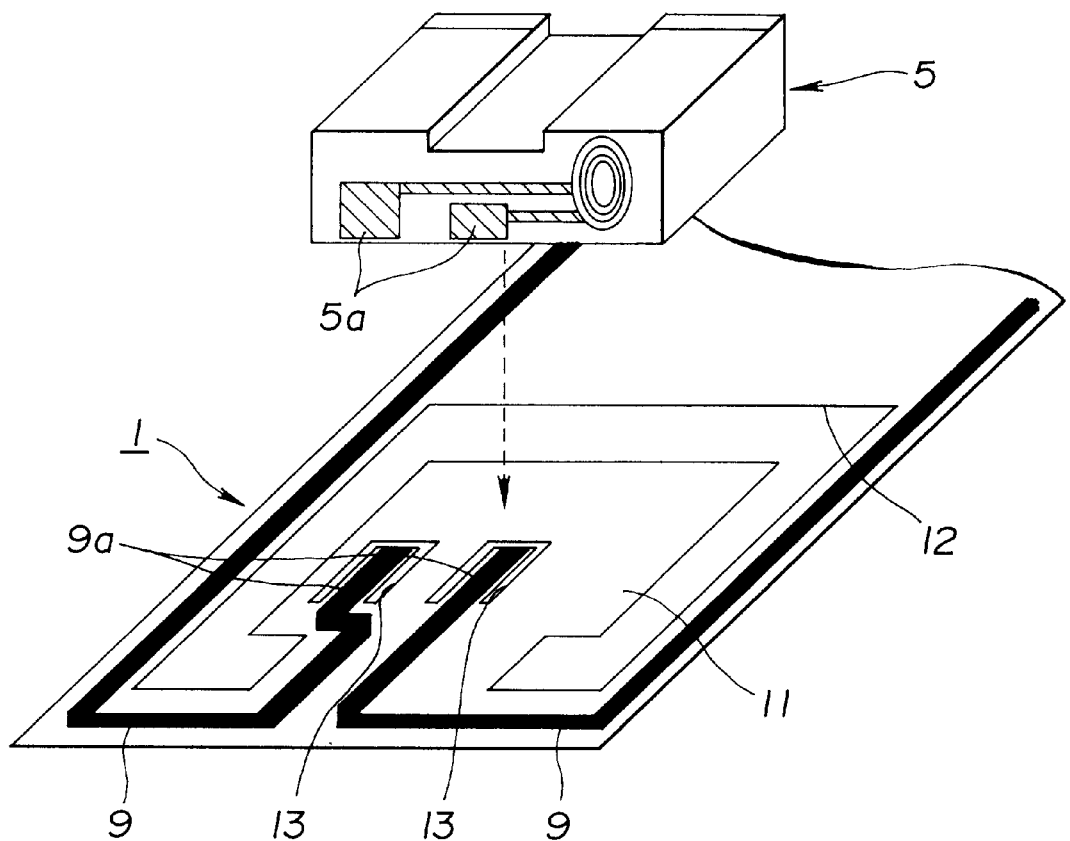
FIG. 6 is an exploded perspective view showing the vicinity of a gimbal portion of the magnetic head device of FIG. 4 to an enlarged scale.

Referring to FIG. 6, which is an enlarged view showing the state of attaching the slider 5 to the gimbal portion 1, the gimbal portion 1 formed on the distal end of the load beam 2 has an aperture 12 for defining a slider mounting portion 11. That is, the aperture 12 is formed around the slider mounting portion 11 configured for mounting the slider 5, with the exception of the distal end of the gimbal portion 1, so that the slider 5 mounted on the slider mounting portion 11 is movable easily in the rolling and pitching directions.

The paired thin-film lead wires 9, formed on the gimbal portion 1, is formed for extending from the distal end of the aperture 12 through the distal end of the gimbal portion 1 up to the slider mounting portion 11, so as not to be interrupted by the aperture 12 formed in the gimbal portion 1, and a terminal 9a is formed on the slider mounting portion 11. The position of the terminal 9a of the thin-film lead wire 9 is configured for registering with the terminal 5a of the magnetic head when the slider 5 is mounted on the slider mounting portion 11. Around the terminals 9a of the thin-film lead wires 9 are formed openings 13, except an area of the slider mounting portion 11 in which the thin-film lead wires 9 have been formed, so that an area of the slider mounting portion 11 formed with the terminals 9a of the thin-film lead wires 9 can be deformed independently.

Figure 7:
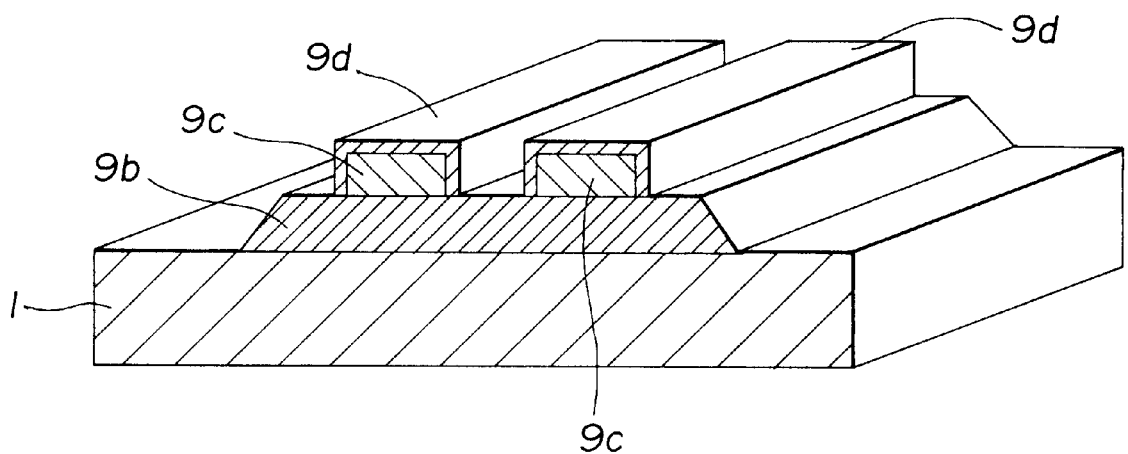
FIG. 7 is a cross-sectional perspective view showing the structure of a thin-film lead wire of the magnetic head device of FIG. 4 to an enlarged scale.

The thin-film lead wire 9, formed on the gimbal portion 1, has an insulating layer and a Cu pattern formed thereon and which is coated with a protective layer. That is, an insulating layer 9b formed of polyimide is formed on the gimbal portion 1 formed of, for example, stainless steel, a conductor pattern 9c formed of, for example, copper, is formed thereon, and a protective layer 9d, formed of, for example, Ni or Au, is formed for covering the conductor pattern 9c for preventing corrosion of the conductor pattern 9c, as shown in FIG. 7.

The insulating layer 9b, formed of polyimide, is formed by coating, for example, a polyimide material, while the protective film 9d, formed by a conductor, such as Ni or Au, is formed by, for example, plating or vapor deposition. The insulating layer 9b, conductor patten 9c and the protective film 9d are patterned to a pre-set shape by photolithographic techniques.

By forming the protective film 9d of the conductor pattern 9c of an electrically conductive material, such as Ni or Au, the film thickness of the thin-film lead wire 9 can be reduced significantly as compared to that of the thin-film lead wire 9 of the conventional system employing a polyimide protective layer. Consequently, the thin-film lead wire 9 is extremely low in toughness, so that the effect of the thin-film lead wire 9 on the movements in the pitching and rolling directions of the slider mounting portion 11 of the gimbal portion 1 can be diminished significantly. Thus, by using the thin-film lead wire 9 having the protective film 9d formed by a conductor, such as Au, there is no risk of obstruction of the movement of the slider 5 under the effect of the thin-film lead wire 9.

Since the toughness of the thin-film lead wire 9 becomes critical only in the portion of the slider mounting portion 11 taking part in the movement in the pitching and rolling directions, it is sufficient if only the portion of the protective film 9d of the thin-film lead wire formed on the gimbal portion 1 is formed of a conductor, such as Ni or Au, with the portion of the protective film 9d of the thin-film lead wire 9 formed on the arm mounting portion, elastic portion 7 and the tough portion 8 of the load arm 2 being formed of, for example, polyimide, as in the case of the conventional thin-film lead wire.

Figure 8:
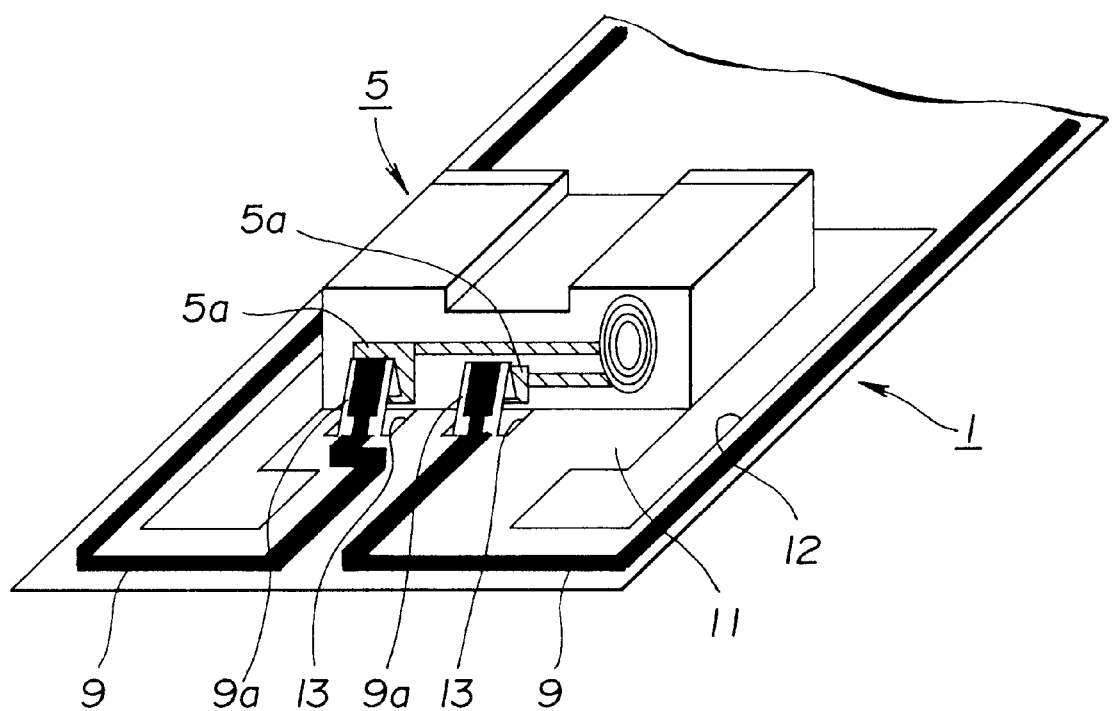
FIG. 8 is a perspective view showing the vicinity of the gimbal portion of the magnetic head device of FIG. 5 to an enlarged scale.

The slider 5, mounted on the gimbal portion 1, is mounted on the slider mounting portion 11, so that the position of the terminal 9a of the thin-film lead wire 9 is in register with that of the terminal 5a of the magnetic head, as shown in FIG. 8. At this time, the portions of the slider mounting portion 11 carrying the terminals 9a of the thin-film lead wires 9 are bent towards the slider 5 while being folded in a chevron shape. This contacts the terminals 9a of the thin-film lead wires 9 with the terminals 5a of the magnetic head thus establishing electrical connection between the terminals 9a of the thin-film lead wires 9 and the terminals 5a of the magnetic head.

Figure 9:
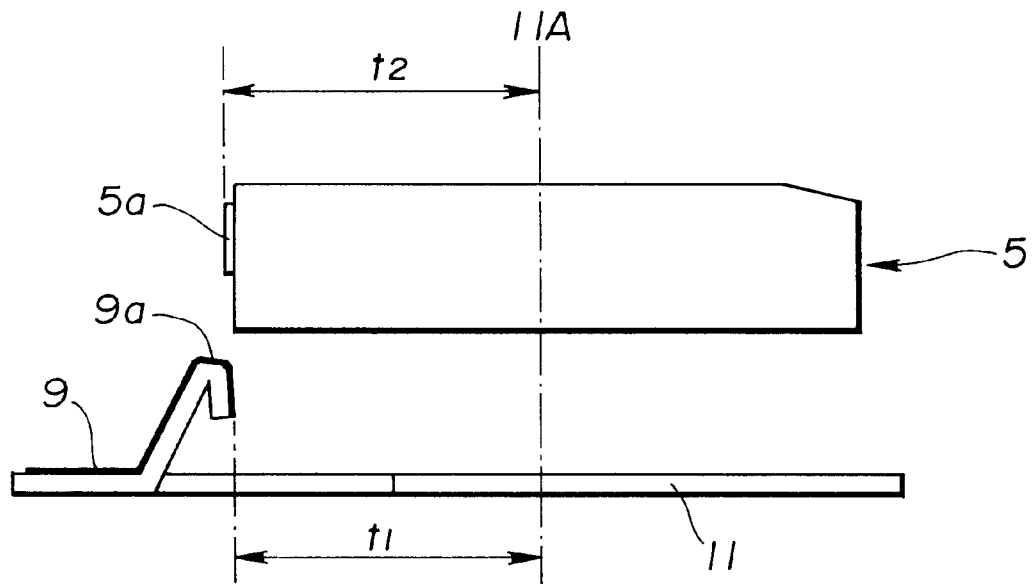
FIG. 9 is a side view showing the relative disposition between the terminals of the thin-film lead wire and the terminals of the magnetic head.
Figure 10:
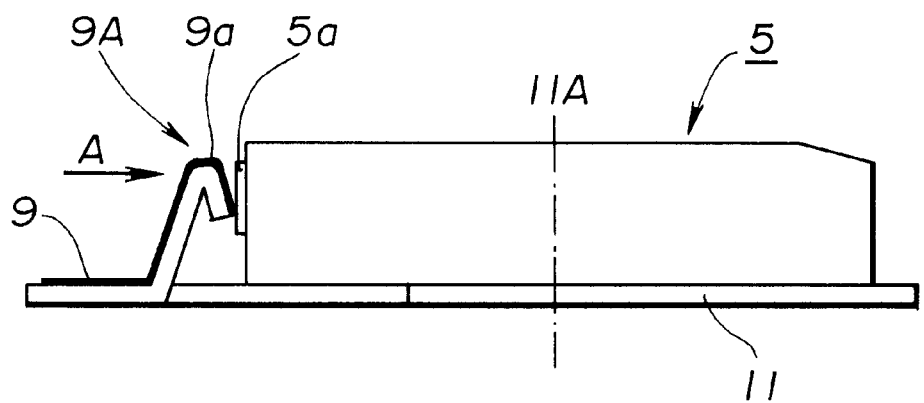
FIG. 10 is a side view showing the state in which the slider is mounted on a slider mounting portion.

The terminal 9a of the thin-film lead wire 9 is arranged so that, when the terminal 9a of the thin-film lead wire is bent as described above, a distance t1 from the center 11A of the slider mounting portion 11 as far as the terminal 9a of the thin-film lead wire 9 is smaller than a distance t2 from the center 11A of the slider mounting portion 11 as far as the terminal 5a of the magnetic head 5, as shown in FIG. 9. In this case, when the slider 5 is mounted on the slider mounting portion 11, as shown in FIG. 10, a portion 9A of the thin-film lead wire 9 carrying the terminal 9a operates as a spring plate thrusting the terminal 9a of the thin-film lead wire 9 against the terminal 5a of the magnetic head, as shown by arrow A in FIG. 10, for positively establishing electrical connection between the terminals 9a of the thin-film lead wires 9 and the terminals 5a of the magnetic head, as indicated by arrow A in FIG. 10.

Since the terminals 9a of the thin-film lead wires 9 are thrust against the terminals 5a of the magnetic head, there is no necessity of bonding the terminals 9a of the thin-film lead wires 9. However, for more reliable connection between the terminals 9a of the thin-film lead wires 9 and the terminals 5a of the magnetic head, any suitable fixing means, such as ultrasonic bonders or soldering, may be used simultaneously.

Figure 11:
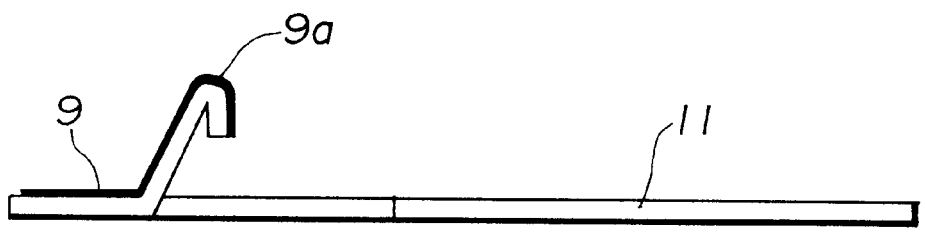
FIG. 11 is a side view showing the state of mounting the slider on the slider mounting portion.
Figure 12:
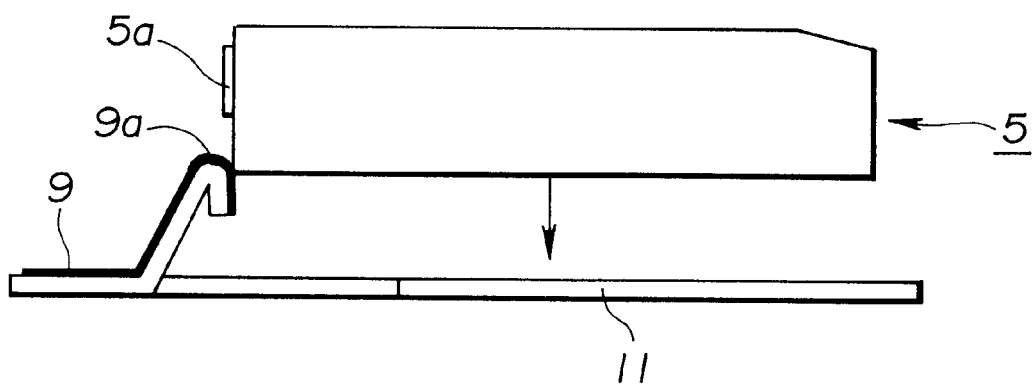
FIG. 12 is a side view showing the start of mounting the slider on the slider mounting portion.
Figure 13:
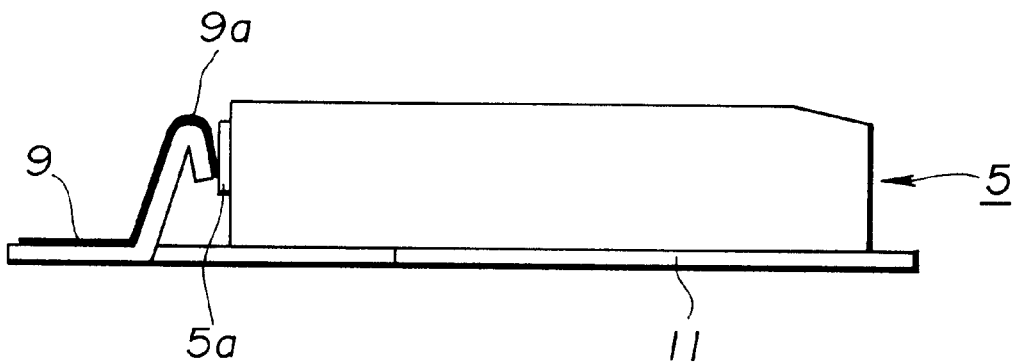
FIG. 13 is a side view showing the state in which the slider has been mounted on the slider mounting portion.

For mounting the slider 5 on the slider mounting portion 11 in this manner, the portion of the thin-film lead wire 9 carrying the terminal 9a is previously bent towards the slider 5 and simultaneously folded in a chevron shape, as shown in FIG. 11. Subsequently, the slider 5 is mounted in position on the slider mounting portion 11. This thrusts the terminal 9a of the thin-film lead wire 9 against the terminal 5a of the magnetic head for establishing electrical connection between the terminals 9a of the thin-film lead wires 9 and the terminals 5a of the magnetic head, before mounting the slider 5 on the slider mounting portion 11, as shown in FIG. 13.

Figure 14:
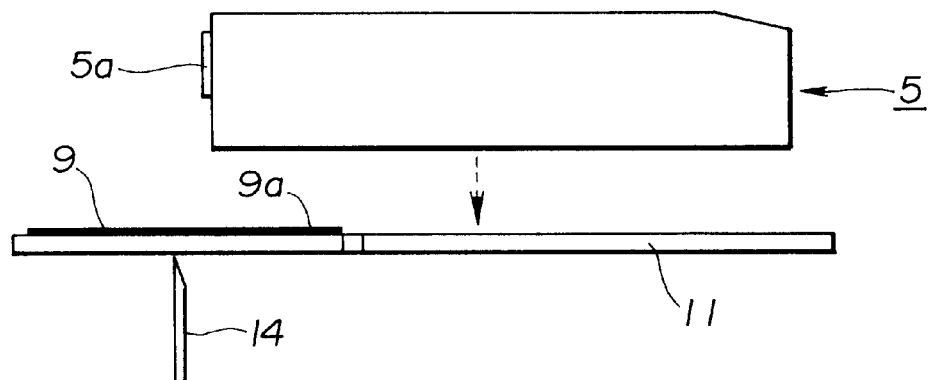
FIG. 14 is a side view showing the manner of mounting the slider on the slider mounting portion.
Figure 15:
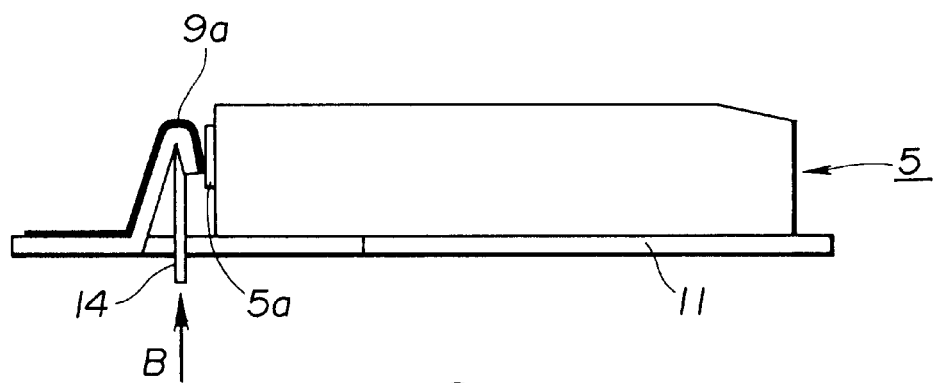
FIG. 15 is a side view showing the manner in which the terminal portions of the thin-film lead wire are bent by a knife edge.
Figure 16:
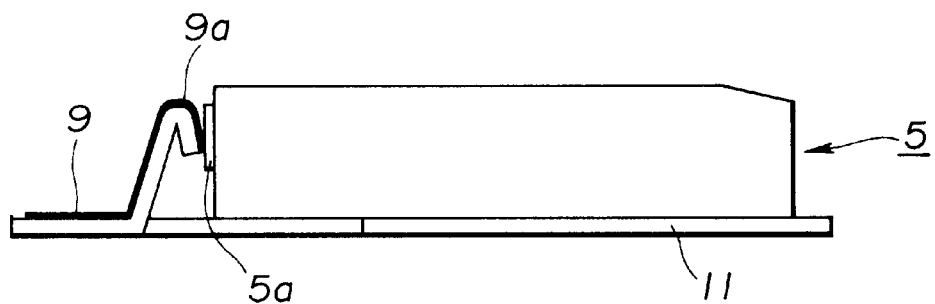
FIG. 16 is a side view showing the state in which the slider has been mounted on the slider mounting portion.

Alternatively, the slider 5 is mounted in position on the slider mounting portion 11, as shown in FIG. 14, after which the portion of the thin-film lead wire 9 formed with the terminal 9a is thrust from below towards above, using a knife edge 14, as indicated by arrow B in FIG. 15. This causes the terminal 9a of the thin-film lead wire 9 to be folded in a chevron shape, as shown in FIG. 16, with the terminal 9a of the thin-film lead wire 9 being thrust against the terminal 5a of the magnetic head. The result is that the terminal 9a of the thin-film lead wire 9 is electrically connected with the terminal 5a of the magnetic head and subsequently the slider 5 is mounted on the slider mounting portion 11.

Thus, with the magnetic head device of the present embodiment, the terminal 5a of the magnetic head can be connected to the terminals 9a of the thin-film lead wire 9 at the same time as the slider 5 is mounted on the slider mounting portion 11. Moreover, with the present magnetic head device, the terminal 5a of the magnetic head can be connected to the terminal 9a of the thin-film lead wire 9 simply by bending the terminal 9a of the thin-film lead wire 9, so that the electrical connection between the terminals 5a of the magnetic head and the terminals 9a of the thin-film lead wires 9 can be established far more easily than if the terminals 5a of the magnetic head and the terminals 9a of the thin-film lead wires 9 are interconnected by, for example, Au balls.

In bending the terminal 9a of the thin-film lead wire 9, it suffices if the terminal 9a of the thin-film lead wire 9 is contacted with the terminal 5a of the magnetic head by such bending, while the bending in the chevron shape is merely illustrative and not limitative of the present invention.

Figure 17:
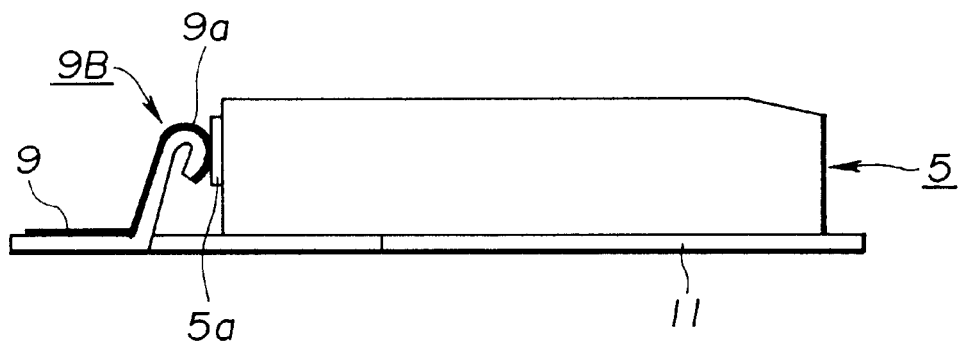
FIG. 17 is a side view showing an illustrative manner of connection of the terminals of the thin-film lead wire to the terminals of the magnetic head.

Specifically, the portion of the thin-film lead wire 9 carrying the terminal 9a may be bent towards the slider 5, and the distal portion 9B thereof may be bent with a pre-set R, as shown in FIG. 17.

Figure 18:
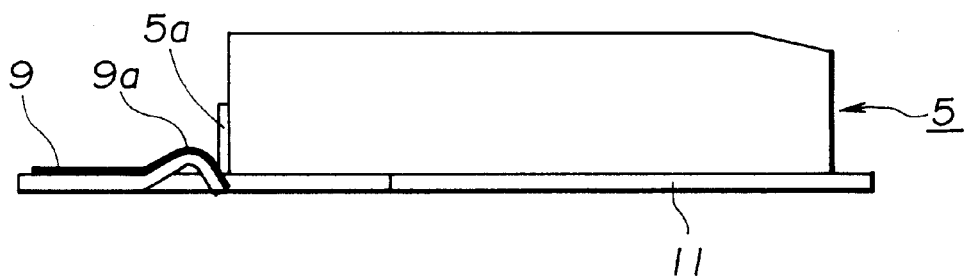
FIG. 18 is a side view showing another illustrative manner of connection of the terminals of the thin-film lead wire to the terminals of the magnetic head.

Alternatively, the portion of the magnetic head carrying the terminal 5a is formed at a low position reaching the mounting surface on the slider mounting portion 11, and the portion of the thin-film lead wire 9 carrying the terminal 9a of the thin-film lead wire 9 may be bent slightly, as shown in FIG. 18.

Figure 19:
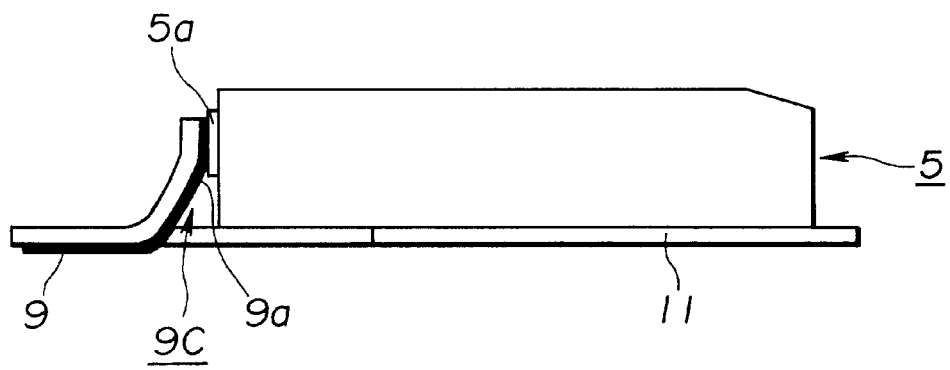
FIG. 19 is a side view showing still another illustrative manner of connection of the terminals of the thin-film lead wire to the terminals of the magnetic head.

Still alternatively, the thin-film lead wire 9 may be formed on the back surface of the slider mounting portion 11 and an end portion 9C of the thin-film lead wire 9 may be bent towards the slider 5, as shown in FIG. 19. By so doing, it suffices to bend the terminal 9a of the thin-film lead wire 9 in one direction for establishing electrical between the terminals 9a of the thin-film lead wires 9 and the terminals 5a of the magnetic head, while the necessity of bending the terminal 9a in a chevron shape may be eliminated.

The shape of an opening 13, formed around the formed around the terminal 9a of the thin-film lead wire 9, bent as described above so as to be connected to the terminal 5a of the magnetic head, needs only to be configured to permit the portion of the slider mounting portion 11 carrying the terminal 9a of the thin-film lead wire 9 to be flexed independently.

Figure 20:
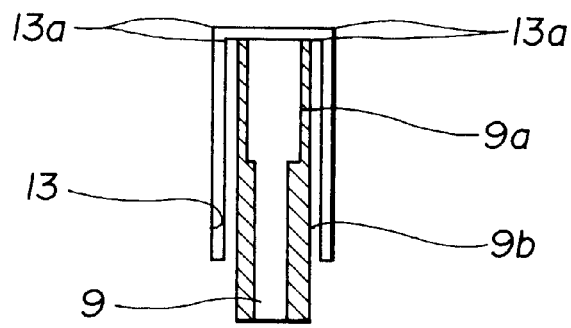
FIG. 20 is a plan view showing an illustrative shape of an opening formed around the terminals of the thin-film lead wire.
Figure 21:
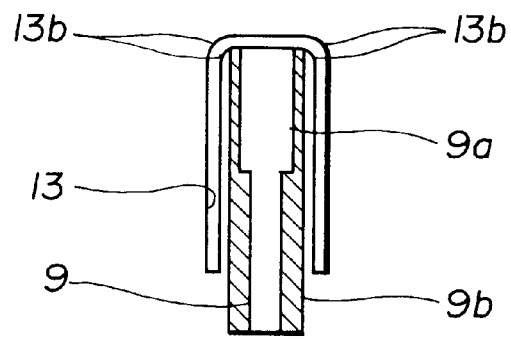
FIG. 21 is a plan view showing another illustrative shape of an opening formed around the terminals of the thin-film lead wire.
Figure 22:
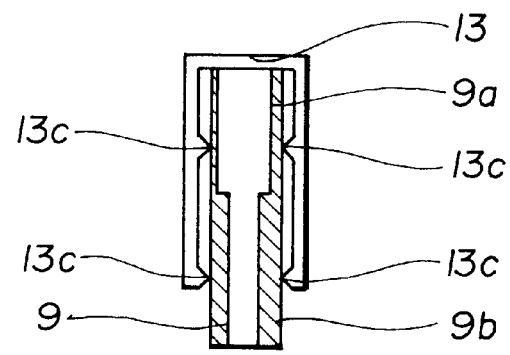
FIG. 22 is a plan view showing another illustrative shape of an opening formed around the terminals of the thin-film lead wire.

The illustrative shape of the opening 13 is shown in FIGS. 20 to 22 showing the vicinity of the terminal 9a of the thin-film lead wire 9 to an enlarged scale.

The opening 13 is formed on three sides of the terminal 9a of the thin-film lead wire 9, comprised of the insulating layer 9b and the conductor pattern 9c covered by the protective film 9d, excepting the side by which the thin-film lead wire 9 is led out, while the corners of the opening 13 are formed as right-angle corners, as shown in FIG. 20. The opening 13 of such shape is simpler in shape and hence may be formed easily.

Alternatively, the opening 13 is formed on three sides of the terminal 9a of the thin-film lead wire 9, comprised of the insulating layer 9b and the conductor pattern 9c covered by the protective film 9d, excepting the side by which the thin-film lead wire 9 is led out, while the corners of the opening 13 are formed as rounded corners, as shown in FIG. 21. If the opening 13 is of such shape, there is no risk of sharp edges being formed on bending the gimbal portion around the opening 13. By rounding the opening 13 in this manner, there is no risk of the edge portion around the terminal 9a of the thin-film pattern 9 damaging the magnetic head and the slider 5.

Still alternatively, the opening 13 is formed on three sides of the terminal 9a of the thin-film lead wire 9, comprised of the insulating layer 9b and the conductor pattern 9c covered by the protective film 9d, excepting the side by which the thin-film lead wire 9 is led out, while notches 13c are formed at bending portions of the gimbal portion 1 on the terminal ends of the opening 13 and on both sides of the terminal 9a of the thin-film lead wire 9, as shown in FIG. 22. By providing these notches 13c, the portions of the terminal 9a of the thin-film lead wire 9 may be bent as shown in FIGS. 11 to 13 and 14 to 16 along these notches 13c for enabling the thin-film lead wire 9 to be bent at the pre-set positions.

In the foregoing description, there are two terminals of the magnetic head and only two thin-film lead wires. However, the number of the terminals of the magnetic head is not limited to two. Specifically, a magnetoresistance effect magnetic head for playback may also be used and two terminals are led from this playback head, while an inductive type magnetic head for recording may also be provided and two terminals are led out from this recording head, so that a sum total of four terminals may be led out. Of course, the present invention may be applied to a case in which the number of the terminals of the magnetic heads is three or more, provided that the numbers of the thin-film lead wires and the associated terminals are increased correspondingly.

If the number of the lead wires is increased in this manner, the effect of toughness of the lead wires tends to be increased, while it becomes necessary to interconnect the terminals of the magnetic head and the thin-film lead wires with higher accuracy. Therefore, if an increased number of the lead wires is used, the favorable effects of the present invention, that is low toughness of the thin-film lead wire, obviation of ill effects of higher toughness of the lead wire, and facilitated interconnection of the terminals of the magnetic head and those of the thin-film lead wires, may be exhibited more outstandingly.

In the above description, the gimbal portion is formed at the distal end of the load arm. Of course, the gimbal and the load arm may be formed separately and the gimbal may be mounted at the distal end of the load arm, as in the case of the magnetic head device explained in connection with the prior-art device. However, it is difficult in this case to form the thin-film lead wire for extending from the gimbal as far as the load arm. Therefore, the thin-film lead wire may be formed only on the gimbal portion and one of the terminals of the thin-film lead wire formed on the gimbal connected to the magnetic head as described above, with the opposite terminals of the thin-film lead wire formed on the gimbal being then connected to the lead wire connected to the external circuit. As a matter of course, the lead wire connected to the other terminal of the thin-film lead wire is irrelevant to the movement of the magnetic head in the pitching and rolling directions, so that toughness of the lead wire raises no particular problem.

An illustrative magnetic recording device, having loaded thereon the above-described magnetic head device, is now explained only briefly.

Figure 23:
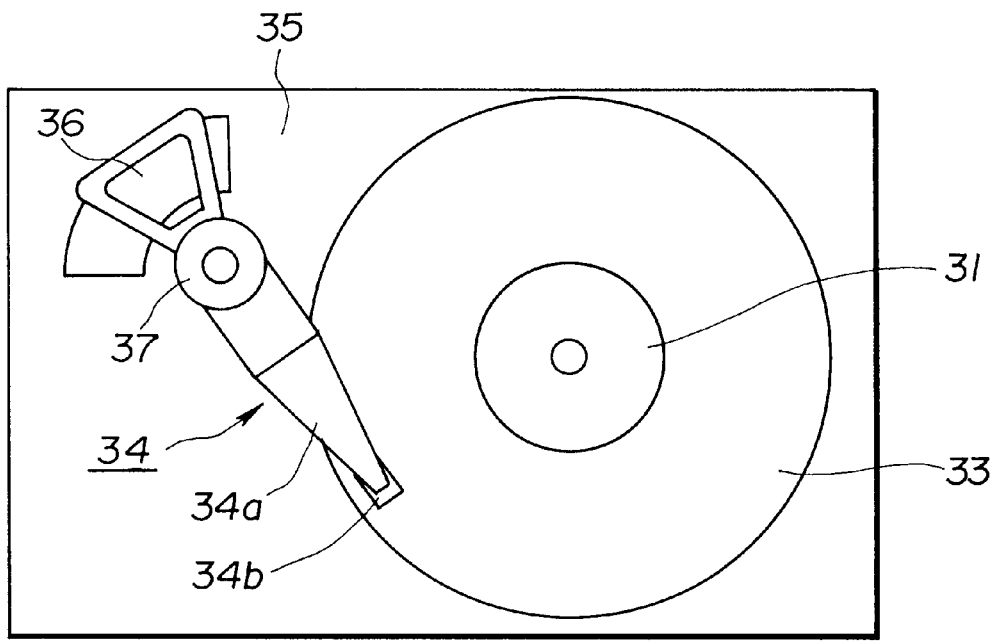
FIG. 23 is a plan view showing an illustrative structure of a magnetic recording device.
Figure 24:
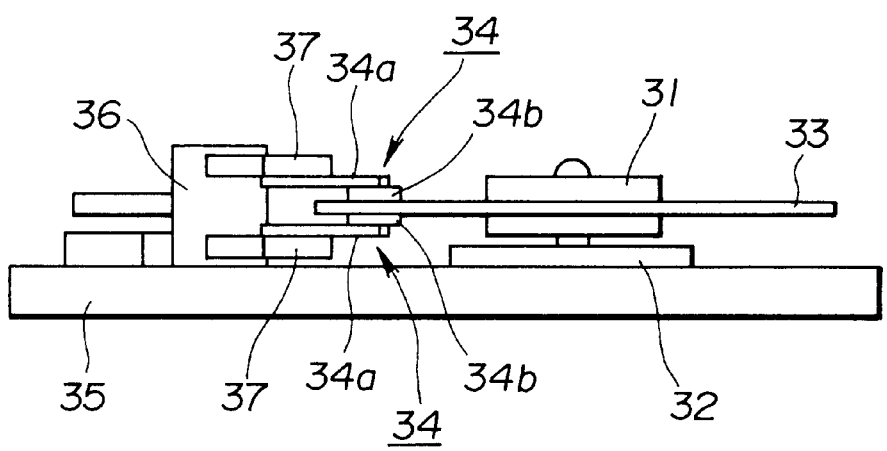
FIG. 24 is a front view showing an illustrative structure of a magnetic recording device.

Referring to FIGS. 23 and 24, the magnetic recording device includes a magnetic disc 33, locally secured in position by a clamper 31 and run in rotation by a spindle motor 32, a magnetic head device 34, having a slider 34b carrying a magnetic head at the distal end of a load arm 34a and a common chassis 35 carrying the magnetic disc 33 and the magnetic head device 34. The magnetic recording device records/reproduces the information on or from the magnetic disc 33 by this magnetic head device 34. The magnetic head device 34 is mounted on the opposite side of the magnetic disc 33 with respect to the magnetic head device 33 for recording/reproducing the information on or from both sides of the magnetic disc 33. The rear ends of these magnetic head devices 34 are mounted to an arm 37 moved by, for example, a voice coil motor 36. The magnetic head device 34 is moved by this arm 37 so that, for recording/reproduction, the slider 34b carrying the magnetic head is moved to a pre-set position on the magnetic disc 33.

I claim:

1. A magnetic head assembly comprising:
   a gimbal having distal and proximal ends;
   a slider, with a magnetic head thereon, having an air bearing surface, a top surface parallel and opposite said air bearing surface and an end surface orthogonal to said air bearing surface, said top surface is mounted on said gimbal;
   a thin-film lead wire formed on a first terminal of said gimbal, said first terminal defined by slots formed in said gimbal, said first terminal is elongated and extends from an attached end to a free end, the attached end is attached to the distal end of said gimbal and the free end is separated from said gimbal towards the proximal end;
   a second terminal on said end surface of said magnetic head, said first terminal extends out of a plane defined by the distal end and the proximal end of said gimbal and has at least two bends between and including the attached end and the free end so that said first terminal engages said second terminal establishing electrical connection between said first terminal and said second terminal.

2. The magnetic head assembly of claim 1 wherein said first terminal of said thin-film lead wire is biased towards the said second terminal of said magnetic head under elasticity of said gimbal.

3. The magnetic head assembly of claim 1 further comprising a load beam wherein said gimbal is formed at a distal end of said load beam and wherein said thin-film lead wire extends from said gimbal to said load beam.

4. The magnetic head assembly of claim 1 wherein a terminal portion of said thin-film wire is covered by an electrically conductive protective film.

5. The magnetic head assembly of claim 1 wherein said thin-film lead wire is covered completely with an electrically conductive protective film except wherein electrical contact is made with the head.

6. The magnetic head assembly of claim 1 wherein notches are formed at a portion of said at least two bends of said gimbal.

* * * * *